United States Patent [19]

Azagury et al.

[11] Patent Number: 5,796,999
[45] Date of Patent: Aug. 18, 1998

[54] METHOD AND SYSTEM FOR SELECTABLE CONSISTENCY LEVEL MAINTENANCE IN A RESILENT DATABASE SYSTEM

[75] Inventors: Alain Charles Azagury, Nesher; Danny Dolev, Mevaseret Yerushalayim, both of Israel; German Goft, Endicott, N.Y.; John Michael Marberg, Haifa, Israel; James Gregory Ranweiler, Rochester, Minn.; Julian Satran, Somers, N.Y.

[73] Assignee: International Business Machines Corporation, Armonk, N.Y.

[21] Appl. No.: 228,319

[22] Filed: Apr. 15, 1994

[51] Int. Cl.$^6$ ........................................ G06F 17/00
[52] U.S. Cl. .................. 395/600; 395/200.03; 364/282.4; 364/DIG. 1
[58] Field of Search ........................ 395/425, 575, 395/600, 650, 445, 200.03

[56] References Cited

U.S. PATENT DOCUMENTS

| | | | |
|---|---|---|---|
| 4,432,057 | 2/1984 | Daniell et al. | 395/725 |
| 4,714,996 | 12/1987 | Gladney et al. | 395/600 |
| 4,769,772 | 9/1988 | Dwyer | 395/600 |
| 4,853,843 | 8/1989 | Ecklund | 395/600 |
| 4,881,166 | 11/1989 | Thompson et al. | 364/DIG. 1 |
| 5,005,122 | 4/1991 | Griffin et al. | 364/DIG. 1 |
| 5,008,853 | 4/1991 | Bly et al. | 395/153 |
| 5,019,963 | 5/1991 | Alderson et al. | 394/600 |
| 5,155,847 | 10/1992 | Kirouac et al. | 395/600 |
| 5,170,480 | 12/1992 | Mohan et al. | 395/600 |
| 5,222,217 | 6/1993 | Blount et al. | 395/153 |
| 5,261,069 | 11/1993 | Wilkinson et al. | 395/425 |
| 5,333,265 | 7/1994 | Orimo et al. | 364/DIG. 1 |
| 5,423,037 | 6/1995 | Hvasshovd | 395/600 |
| 5,440,727 | 8/1995 | Bhide et al. | 395/444 |

*Primary Examiner*—Thomas G. Black
*Assistant Examiner*—Hosain T. Alam
*Attorney, Agent, or Firm*—Steven W. Roth; Andrew J. Dillon

[57] ABSTRACT

In a resilient database system which includes a journaled database which is implemented at one or more locations within a distributed data processing system, multiple diverse consistency levels are specified which each detail a level of consistency to be maintained between a primary database and a replica database. A user is then permitted to select a particular level of consistency for each replica database. Thereafter, each update to a record within the primary database is utilized to initiate an update to the corresponding record within each replica database in a manner which is consistent with the selected level of consistency for that replica database. In this manner, a replica database which is fully consistent with the primary database may be provided for seamless switchover in the event of a primary database failure, while a second replica database may be provided to respond to queries by applications which do not require fully consistent data, greatly enhancing the efficiency of access to that database.

4 Claims, 10 Drawing Sheets

METHOD AND SYSTEM FOR SELECTABLE CONSISTENCY LEVEL MAINTENANCE IN A RESILENT DATABASE SYSTEM

BACKGROUND OF THE INVENTION

1. Technical Field

The present invention relates in general to an improved method for database access control and in particular to an improved method and system for maintaining consistency between a primary database and one or more replica databases. Still more particularly, the present invention relates to an improved method and system for permitting a user to select diverse consistency levels to be imposed upon multiple replica databases within a resilient database system.

2. Description of the Related Art

A multiprocessing general purpose computing system typically includes a plurality of nodes which are interconnected by a communication network. Each node, in such a system, may include a data processor, a data storage device, and multiple communication ports. A data processor may be executing, in a multiprogramming mode, under control of a plurality of operating system components, and which event the data processor may be considered a plurality of nodes. The data storage device typically stores a data file, the operating system and its information management components and user application programs.

Data is information which is abstracted from some aspect of business which is important to an enterprise. The challenge within such systems is to utilize the data storage and communication resources of the system in a manner which gives end users access to the data with an availability, performance and cost commensurate with their business needs. Access to the data must be controlled to ensure the consistency and integrity of the data. Among additional characteristics of data accesses in a distributed data processing environment are geographic and temporal affinity.

The basis for distributed data structures is geographic affinity: accesses to a given data item tend to cluster geographically. A basis for the method of dynamic replication of data is temporal affinity: data items which have been accessed recently may be more likely to be accessed in the near future than data items which have not been recently accessed. The node at which accesses for a given data item tend to cluster is called the affinity node; the affinity node for a given data item may not be known ahead of time, and that node may vary with time.

Distributed data technology may be categorized according to the attributes of data location, degree of data sharing, degree to which database management control is provided network-wide, and to the type of data access. Data location may be centralized, partitioned or replicated. The degree of data sharing may be centralized, decentralized or distributed. Database management control may be user provided (distributed data) or system provided (distributed database). Data access may be by transaction shipping, function shipping or data shipping.

Historically, a centralized approach has been utilized for managing database storage and accesses. In such an approach both data management and application processing are centralized. A single database manager is utilized and a teleprocessing network is utilized to connect users to the central facility. In a variation on the centralized approach, some of the processing may be distributed among nodes within the network; however, the data is kept centralized.

The advantages of a centralized database approach are: (1) database integrity may be ensured by the single database manager; (2) all application programs may be written to a single application programming interface and application programs need not be aware of data locations since all data is stored within a single location; (3) many tools are available to solve the problems of administering data within a centralized data environment; and (4) a single system is easier to operate, maintain and control.

However, there are certain disadvantages to a centralized database approach which include: (1) communication costs are high for certain enterprises and application performance may be degraded due to communication delays; (2) data availability may be poor due to instability in the teleprocessing network or the central system, which may have to mitigated by backup systems and redundant communication; and (3) the processing capabilities of a single system have already been reached by some enterprises.

Two general approaches exist for distributing data to nodes of a distributed data processing system. These approaches are (1) partitioning, and (2) static replication. In the partitioned data approach there is no primary copy of the database, whereas there may be in static replication.

A partitioned database approach divides the database into distinct partitions, and these partitions are then spread out among the nodes. A given data item resides at only one node location. Each location has a database manager which manages the data at that location. A data distribution manager takes a data request from an application program and maps that request to a local request, if the data is held locally, or to a remote request if the data is held at another location.

Good data availability and access performance result in a partitioned distributed database if the data required is held locally. Furthermore, database integrity is facilitated since each data item is managed by a single database manager. These results may be achieved if a good partitioning algorithm exists, is known ahead of time, and is stable.

In a partitioned database such as those described above, the system must provide a network-wide scope of recovery for programs which change data at more than one location.

A partitioned database system also includes certain disadvantages including: (1) a reduced availability and performance result if the partitioning algorithm does not match the data access patterns; (2) the application program may have to be aware of data location, or at least the data partitioning algorithm, and access the database differently, dependent upon data location; (3) changing the database partitioning algorithm is very difficult because data location is reflected in the application programs, exits or declarations at each node (4) existing data relocation and algorithm changes at each node must be synchronized network-wide and therefore the partitioning algorithm may not be adjusted as needed to maintain optimum performance and availability; and (5) programs which access data items uniformly across a partitioned database, or which must access the entire database, will suffer poor performance and availability.

Static replication techniques for distributing data include those which include or do not include a central node. In the former, the central location stores a primary copy of the database, and each location has a database manager and a copy of the database. In typical uses of static replication, the primary database is copied and sent to each replica location, or node, where the data becomes available for local processing. Data modifications made at each replica location are collected for later processing against the primary database. Between periods of application processing, local modifications are sent to the central location and applied against the primary database. Because this technique for managing replicated databases does nothing to prevent multiple updates, the occurrence of each such update must be detected during a primary database update and resolved manually, otherwise the application must be restricted so that somehow multiple updates do not occur. After the primary database has been made to conform to replica changes, new copies are sent to the replica locations and the entire process begins again.

The main advantage of static replication with a primary copy at a central location is high availability and good response time since all data is locally accessible. However, significant disadvantages exist, including: (1) because the system does not prevent multiple updates, database integrity is difficult to ensure, severely restricting the database processing which is feasible for static replicas; (2) the system does not ensure current data for application access as requiring such; (3) special operational procedures are required for collecting and applying replica modifications to the primary database, which can be costly and prone to error; and (4) the database may not be available during the confirmation procedure, providing a large enough window for confirmation is not feasible in many applications since the data transmission bandwidth may be unnecessarily large between updates and replicas are transmitted only during the narrow window between periods of operation. Further, if one or more of node is incapacitated, then confirmation may not be possible in the scheduled window.

Many variations have been described in the literature with respect to the basic techniques of static replication described above. The application can be designed so that multiple updates do not occur, or the replicas can be limited to read accesses only. The application program can collect updates itself for later transmission to the primary location, where this information may be gleaned from database manager logs. Full replicas or only partial replicas may be formed at the replica locations. The entire replica database or changes to data held can be transmitted. Replicas may be continually synchronized by sending modifications made by a transaction to the various nodes and receiving acknowledgements as a part of transaction termination processing. Such techniques of synchronization may solve the integrity problems of static replications; however, these techniques lose much of the performance and availability benefits of such systems.

U.S. Pat. No. 4,007,450, by Hiabt, describes a distributed data control system wherein each node shares certain of its data sets in common with other nodes, there being no primary copy of the central location, but replicas which are continually synchronized. Each node is operative to update any shared data set unless one of the other nodes is also seeking to update, in which event the node with the higher priority prevails. Each nodes stores in its memory the node location of each shared data set and the updating priority each node has with respect to each respective set of shared data. When a data set is updated at a node, all nodes having a replica are sent the update. As above, such a technique solves the integrity problem of static replication but loses much of the performance and availability benefits.

U.S. Pat. No. 4,432,057, issued to Daniell et al.; discloses a method for dynamic replication of data under distributed system control in order to control the utilization of resources in a multiprocessing, distributed database system. In this system requests for access to data of a specified concurrency are permitted and confirmation of updated data is selectively deferred by use of a control procedure which is implemented at each node, utilizing a status and control (SAC) message which is filed at each node which describes that node's view of the status for shared data items at other nodes. In this system each database request must be intercepted to determine if the local copy satisfies the concurrency requirements. If not, negotiations with related nodes are required prior to granting the requests. The concurrency of replica databases will thus change dynamically according to the access patterns.

In view of the above, it should be apparent that a need exists for a method and system for utilization in a resilient database system which includes a journaled database which is replicated at one or more locations within the data processing system whereby the consistency level maintained within each replica database may be arbitrarily and selectively assigned.

SUMMARY OF THE INVENTION

It is therefore one object of the present invention to provide an improved method for database access control within a distributed data processing system.

It is another object of the present invention to provide an improved method and system for maintaining consistency between a primary database and one or more replica databases within a distributed data processing system.

It is yet another object of the present invention to provide an improved method and system for permitting a user to select diverse consistency levels to be imposed upon multiple replica databases within a resilient database system in a distributed data processing system.

The foregoing objects are achieved as is now described. In a resilient database system which includes a journaled database which is implemented at one or more locations within a distributed data processing system, multiple diverse consistency levels are specified which each detail a level of consistency to be maintained between a primary database and a replica database. A user is then permitted to select a particular level of consistency for each replica database. Thereafter, each update to a record within the primary database is utilized to initiate an update to the corresponding record within each replica database in a manner which is consistent with the selected level of consistency for that replica database. In this manner, a replica database which is fully consistent with the primary database may be provided for seamless switchover in the event of a primary database failure, while a second replica database may be provided to respond to queries by applications which do not require fully consistent data, greatly enhancing the efficiency of access to that database.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
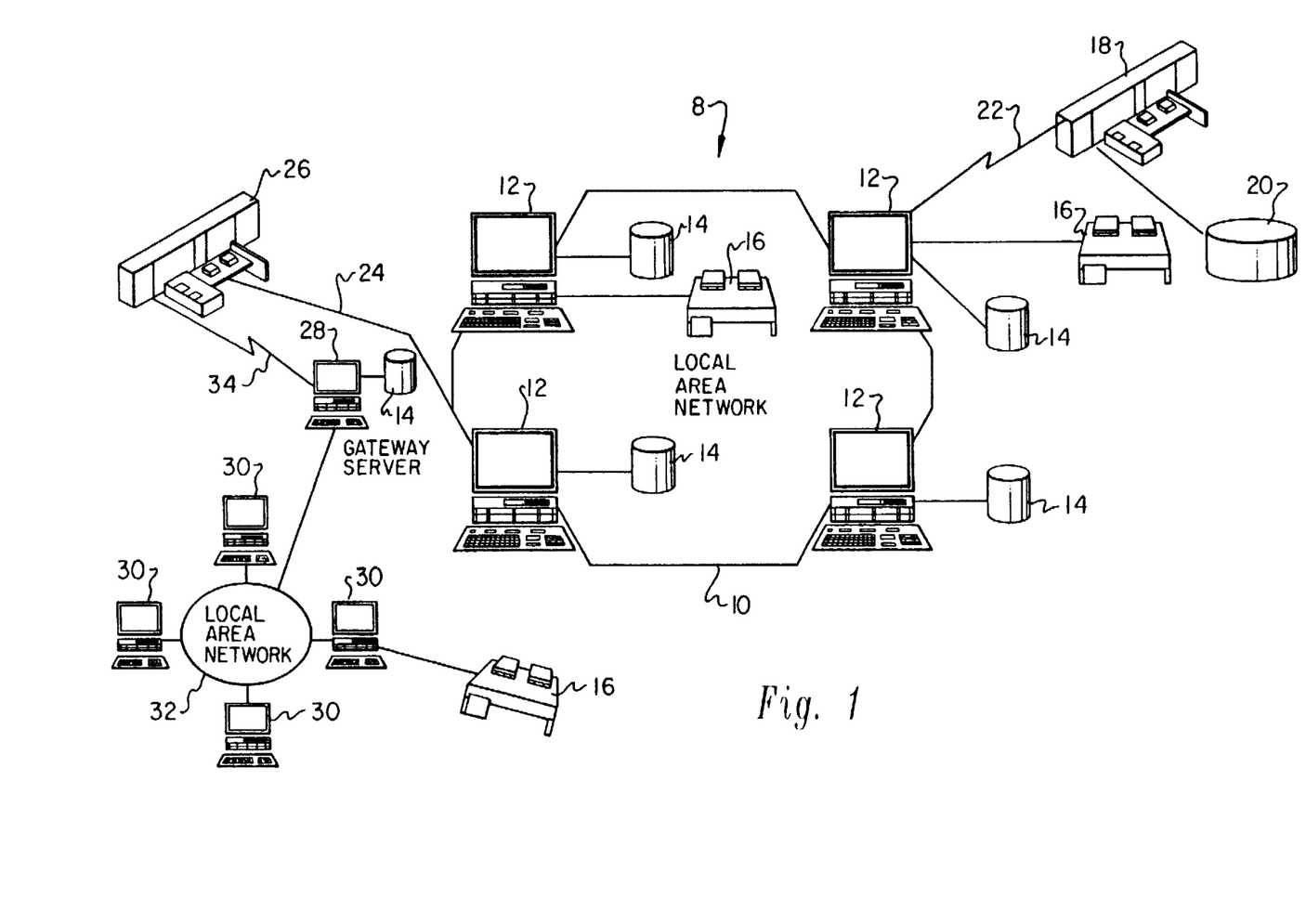
FIG. 1 is a pictorial representation of a distributed data processing system which may be utilized to implement the method and system of the present invention.

With reference now to the figures and in particular with reference to FIG. 1, there is depicted a pictorial representation of a distributed data processing system 8 which may be utilized to implement the method and system of the present invention. As may be seen, distributed data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common is such data processing systems, each individual computer may be coupled to a storage device 14 and/or a printer/output device 16. One or more such storage devices 14 may be utilized, in accordance with the method of the present invention, to store a primary database, or a replica thereof which may be periodically accessed and processed by a user within distributed data processing system 8, in accordance with the method and system of the present invention. In a manner well known in the prior art, each such primary database or replica thereof may be stored within a storage device 14 which is associated with a Resource Manager or Library Service, which is responsible for maintaining and updating the databases associated therewith.

Still referring to FIG. 1, it may be seen that distributed data processing system 8 may also include multiple mainframe computers, such as mainframe computer 18, which may be preferably coupled to Local Area Network (LAN) 10 by means of communications link 22. Mainframe computer 18 may also be coupled to a storage device 20 which may serve as remote storage for Local Area Network (LAN) 10. A second Local Area Network (LAN) 32 may be coupled to Local Area Network (LAN) 10 via communications controller 26 and communications link 34 to a gateway server 28. Gateway server 28 is preferably an individual computer or Intelligent Work Station (IWS) which serves to link Local Area Network (LAN) 32 to Local Area Network (LAN) 10.

As discussed above with respect to Local Area Network (LAN) 32 and Local Area Network (LAN) 10, primary database or replica thereof may be stored within storage device 20 and controlled by mainframe computer 18, as Resource Manager or Library Service for the primary database or replica thereof thus stored.

Of course, those skilled in the art will appreciate that mainframe computer 18 may be located a great geographical distance from Local Area Network (LAN) 10 and similarly Local Area Network (LAN) 10 may be located a substantial distance from Local Area Network (LAN) 32. That is, Local Area Network (LAN) 32 may be located in California while Local Area Network (LAN) 10 may be located within Texas and mainframe computer 18 may be located in New York.

As will be appreciated upon reference to the foregoing, it is often desirable for users within one portion of distributed data processing network 8 to access a database stored in another portion of data processing network 8. In such client/server environments, access to data stored within a database may be increased by providing a so-called "resilient database system." A resilient database system is a journaled database that is replicated at one or more locations within a distributed data processing system. Within such a database one database is designated as the primary database while all others are backup replicas. A resilient database system is resilient to single points of failure. That is, a failure which is caused by a failure of the computer wherein one of the database replicas resides or a media failure which damages one of the replicas. Cluster management can provide a recovery mechanism, transparent to both the application programmer and to the end-user, that allows a seamless switchover to a backup replica in the event of the failure of a primary replica.

In systems in which a database has been replicated in order to provide a high availability of data, a natural extension of such systems is to permit query clients to utilize a backup replica database to alleviate the workload on the primary server. However, unless some consistency is enforced, query transactions on the replica database would be permitted to read values set by uncommitted transactions, as well as outdated values. While this may be acceptable for some non-critical applications, many applications require a minimum level of consistency with respect to the primary database.

For purposes of explanation within this application, the term "application" refers to the application code which is initiated by a user which may invoke a database operation. Many different applications are available which may be utilized to invoke a database operation and such applications are unmodified in accordance with the method and system of the present invention. An "application stub" is also typically provided to be utilized whenever such an application invokes a database operation. The application stub traps the invocation and reroutes that invocation to a special routine. This application stub is generally provided by cluster management and thereafter ships the request to the machine which controls the primary database. Any recovery steps which are required due to a failure are hidden from the application by means of the application stub.

The "primary agent" described within the present application is a process present on the machine which controls the primary database which executes database operations. There is one primary agent per application process. A "backup receiver," as utilized in the present method and system, is a process present on a machine which controls access to a replica database which receives journal entries describing the changes which have been made to the primary database and which deposits those journal entries within a local replica of the journal. There is one backup receiver process for a given database on each machine which controls a replica of the database. A "backup applier" is a process on the machine which controls a replica database which applies the journal entries to the local replica of the database. There is one backup applier process for a given database on each machine which controls a backup replica.

Figure 2:
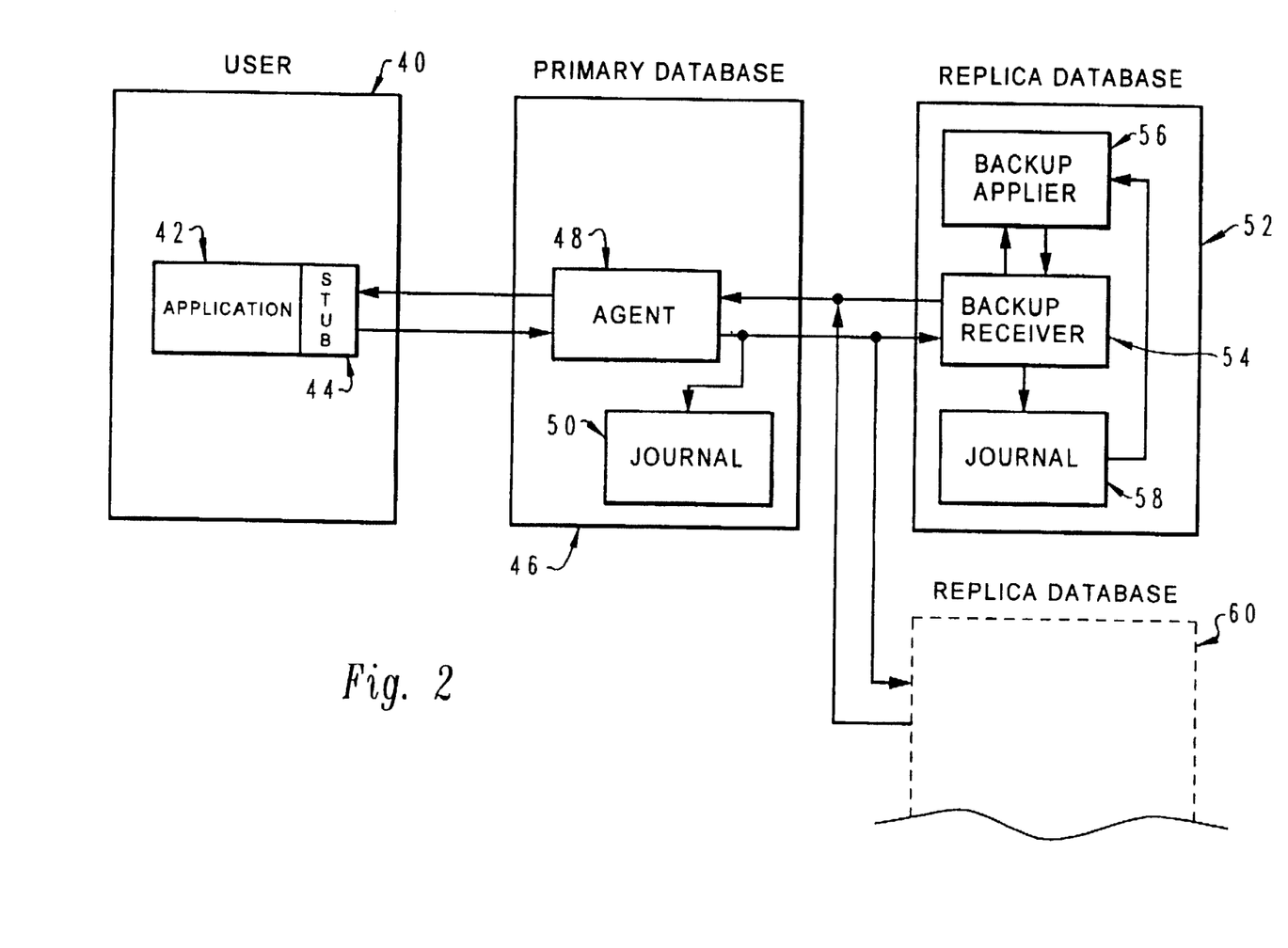
FIG. 2 is a high level control flow for a typical write operation within a resilient database system implemented in accordance with the method and system of the present invention.

Referring now to FIG. 2, there is illustrated a high level control flow for a typical write operation within a resilient database system which is implemented in accordance with the method and system of the present invention. As illustrated, a user 40 may utilize an application 42 which invokes a stub routine 44 to execute an operation within primary database 46. The primary agent 48 within the machine which controls primary database 46 executes that operation. Any journal entries required by that modification are inserted within journal 50 and are broadcast to the backup receiver 54 within replica database 52 and any additional replica databases, such as replica database 60.

Backup receiver 54 acknowledges reception of these journal entries and thereafter asynchronously deposits those entries within a local replica of that journal, such as illustrated at reference numeral 58. Backup applier 56 applies the journal entries contained within journal 58 to the corresponding record within replica database 52 by locking that record, updating the record and thereafter unlocking the record. In this manner, consistency between replica database 52 and primary database 46 may be maintained.

Backup applier 56 thus provides a minimal level of consistency by preventing readers from obtaining partially updated records which might otherwise be obtained if those records were read directly from replica database 52. Of course, the control flow for a database read operation is similar to that depicted within FIG. 2; however, no journal entries are generated and therefore the backup receiver and backup applier are not involved. The environment depicted within FIG. 2 may be implemented utilizing any suitable computer system such as the International Business Machines Corporation Application System/400.

Next, in accordance with an important feature of the present invention multiple diverse consistency levels are provided which may be selected by a user for utilization with a selected replica database. Concurrence within resilient database systems is discussed within "Concurrence Control and Recovery in Database Systems" Addison-Wesley Publishing Company. 1987, which describes a multiversion concurrence control model. In that system the backup replica database may always lag behind the primary, leading to the existence of two versions of the database. In contrast to that system, the method and system of the present invention provide two different consistency properties which are taken into consideration.

Specifically, these two properties comprise the ordering of transactions within the database system and the serializability of those transactions. These two properties may be combined in several ways, leading to six different consistency levels. Thus, in accordance with an important feature of the present invention, three different consistency levels for ordering of transactions may be considered for queries which are reading from a replica database. Of course, those skilled in the art will appreciate that a maximum time lag may be specified for consistency following a record update. A "Level 0" consistency level permits queries to read old values within the replica database. A "Level 1" consistency level imposes a consistency such that queries will read only the latest committed values from the replica databases. Finally, a "Level 2" consistency level imposes a consistency level such that queries will read only the latest values from the replica database, whether or not those values have reached a commit.

Additionally, as described above, the serializability of transactions within the resilient database system of the present invention must be considered in order to assign a desired consistency level. This property guarantees that the possibly interleaved execution of transactions is logically equivalent to a serial execution of those transactions. A resilient database system permits applications under commitment control to run simultaneously on the same database with other applications which are not under commitment control. It is therefore conceivable that different applications may or may not require serializability. Thus, when permitting the user or system administrator to set various diverse levels of consistency for replica databases within the resilient database system of the present invention, two different variables must be set in order to control the level of consistency. Ordering may be set to either "Level 0," "Level 1," or "Level 2." Additionally, serializability must be set to either "true" or "false."

Figure 3:
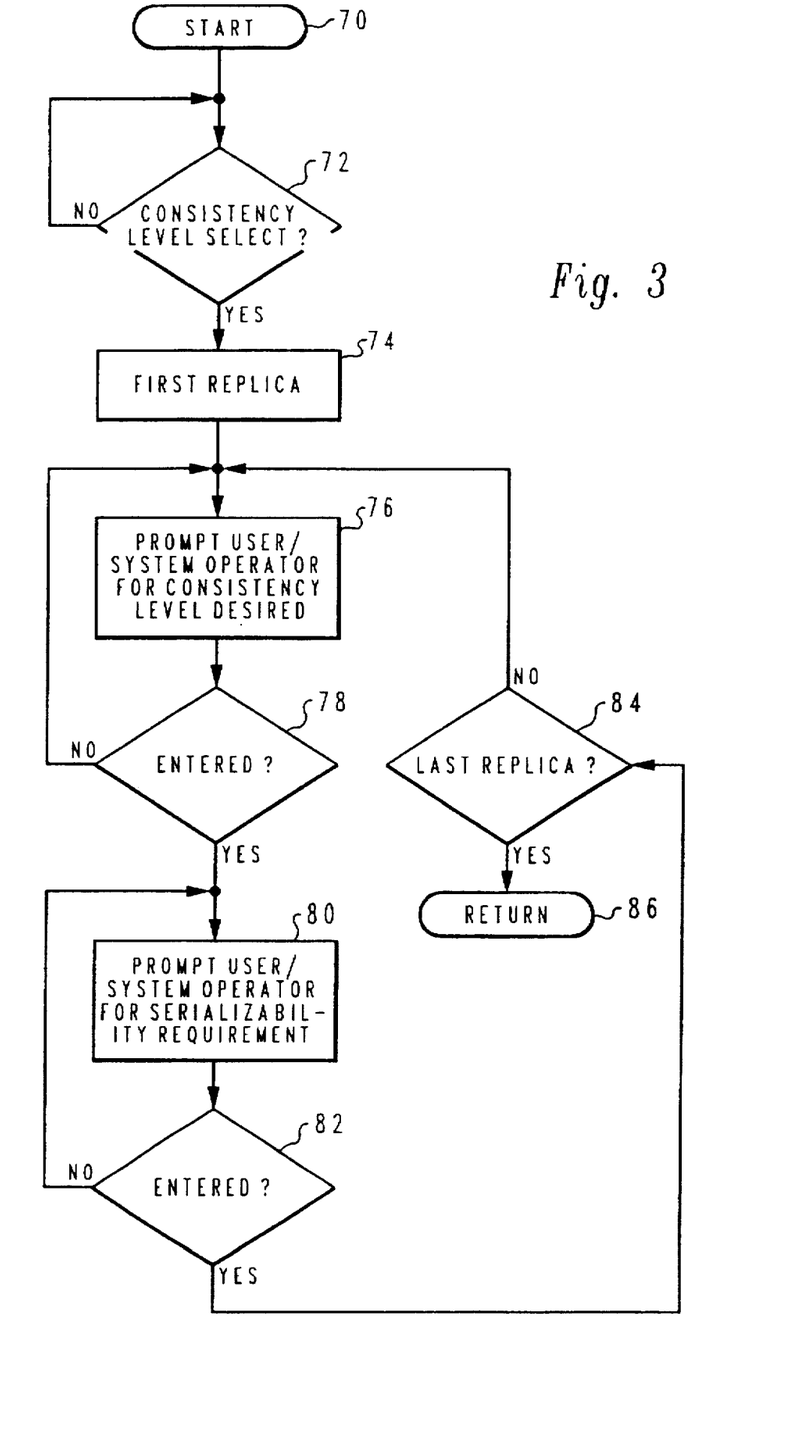
FIG. 3 is a high level logic flowchart which illustrates the establishment of multiple diverse consistency levels within a resilient database in accordance with the method and system of the present invention.

With reference now to FIG. 3, there is depicted a high level logic flowchart which illustrates the establishment of multiple diverse consistency levels within a resilient database in accordance with the method and system of the present invention. As illustrated, this process begins at block 70 and thereafter passes to block 72. Block 72 illustrates a determination of whether or not a consistency level selection has occurred. If not, this process merely iterates until such time as the user or system administrator indicates a desire to set the consistency level for a replica database within the resilient database system.

Still referring to block 72, in the event a consistency level select has occurred, the process passes to block 74. Block 74 illustrates a process which will occur for the first replica database within the resilient database system of the present invention. Next, the process then passes to block 76. Block 76 illustrates the prompting of the user/system operator for a desired consistency level. Thereafter, the process passes to block 78. Block 78 illustrates a determination of whether or not the consistency level desired has been entered and if not, the process returns, in an iterative fashion, to block 76, to once again prompt the user to enter a desired consistency level.

Still referring to block 78, in the event a desired consistency level has been entered, the process passes to block 80. Block 80 illustrates a prompting of the user/system operator for a serializability requirement. That is, an indication of whether or not the interleaved execution of a transaction must be logically equivalent to a serial execution. The process then passes to block 82. Block 82 illustrates a determination of whether or not the user has entered a serializability requirement and if not, the process returns, in an iterative fashion to block 80 to once again prompt the user to enter a serializability requirement for that database. Thereafter, after the user has entered a serializability requirement, the process passes from block 82 to block 84. Block 84 illustrates a determination of whether or not additional replica databases are to be set to one of a plurality of diverse consistency levels and, if the replica database operated upon is not the last replica, the process returns, in an iterative fashion, to block 76 to once again begin the process described herein. Alternately, in the event the last replica database has had a desired consistency level selected, the process passes to block 86 and returns.

Referring now to FIGS. 4–10, there are illustrated high level logic flow diagrams which, when considered together, illustrate the implementation of multiple diverse consistency levels within a resilient database system in accordance with the method and system of the present invention following a record update. As illustrated within FIG. 4, the process begins at block 90. Thereafter, the process passes to block 92 which depicts a determination of whether or not a record update has occurred. In the event no record update has occurred, this process merely iterates until such time as a record update to the primary database occurs. Thereafter, upon the occurrence of a record update, the process passes from block 92 to block 94.

Figure 4:
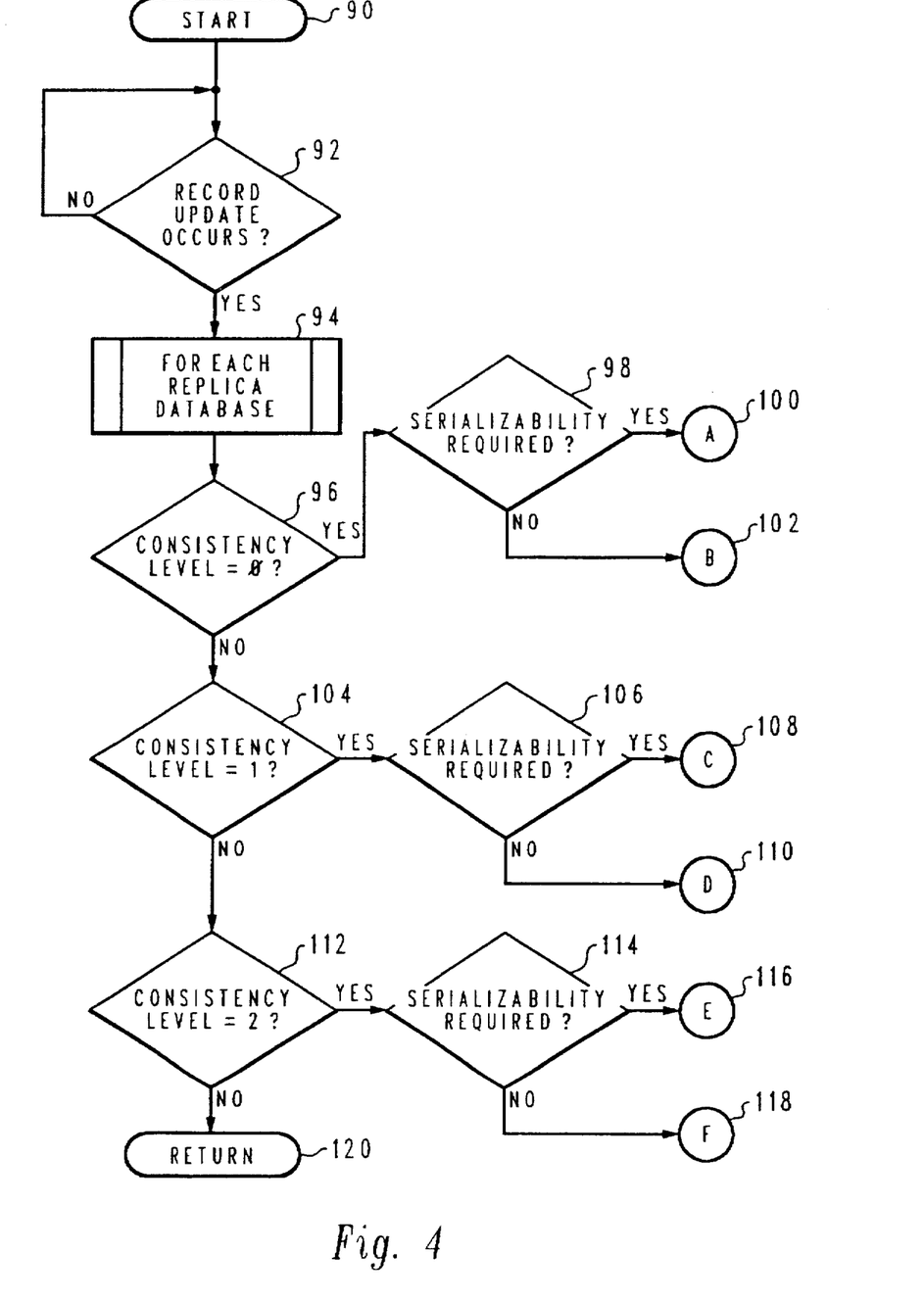
FIGS. 4–10 are a high level logic flow diagram which, when considered together, illustrate the implementation of multiple diverse consistency levels within a resilient database system in accordance with the method and system of the present invention.

Block 94 illustrates the beginning of a process which is reiterated for each replica database within the resilient database system of the present invention. The process then passes from block 94 to block 96. Block 96 illustrates a determination of whether or not the desired consistency level has been set to "Level 0." If so, the process passes to block 98. Block 98 illustrates a determination of whether or not serializability is required and if so, the process passes to the logic flow described within FIG. 5, via off page connector 100. Alternately, in the event serializability is not required, the process passes to the logic flow described at FIG. 6, via off page connector 102.

Referring again to block 96, in the event the desired consistency level is not set to "Level 0," the process passes to block 104. Block 104 illustrates a determination of whether or not the desired consistency level has been set to "Level 1." If so, the process passes from block 104 to block 106 which once again illustrates a determination of whether or not serializability is required. If so, the process passes to the logic flow described at FIG. 7, via off page connector 108. Alternately, in the event serializability is not required, the process passes to the logic flow illustrated at FIG. 8, via off page connector 110.

Referring again to block 104, in the event the desired consistency level is not "Level 1," the process passes from block 104 to block 112. Block 112 illustrates a determination of whether or not the desired consistency level for this replica database is set to "Level 2" and if so, the process passes from block 112 to block 114. As above, block 114 illustrates a determination of whether or not serializability is required and if so, the process passes to the logic flow described within FIG. 9, via off page connector 116. Alternately, in the event serializability is not required, the process passes from block 114 to the logic flow described within FIG. 10 via off-page connector 118. Finally, referring again to block 112, in the event the desired consistency level is not set to "Level 2" the process passes to block 120 and returns.

Figure 5:
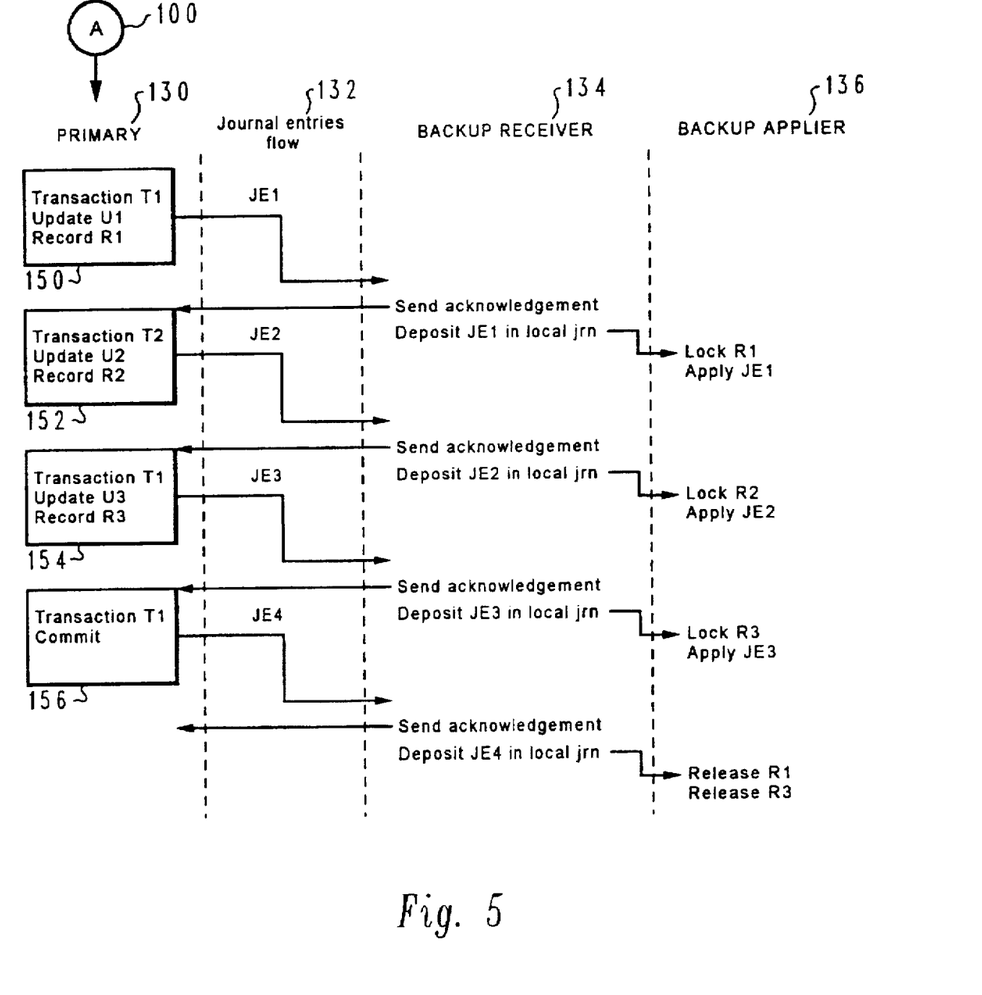

With reference now to FIG. 5, there is depicted the logic flow sequence which occurs in the event a record update has occurred to a record corresponding to a record within a replica database for which consistency level "Level 0" has been chosen, with serializability required. FIGS. 5–10 each include four columns numbered respectively 130, 132, 134, and 136. In each instance column 130 illustrates the activity which will occur at the primary database. Column 132 depicts the journal entry flow while column 134 depicts the activities which occur at the backup receiver within the particular replica database under consideration. Finally, column 136 illustrates the activities of the backup applier (see FIG. 2) within the replica database.

Thus, examining column 130 of FIG. 5, a transaction T1 is illustrated which includes update U1 to record R1, as illustrated at reference numeral 150. This results in a journal entry (JE1) which is transmitted to the backup receiver. The backup receiver then sends an acknowledgement to the primary database and deposits the journal entry (JE1) within the local journal at the replica database. The backup applier then locks record R1 and applies the journal entry (JE1).

Next, as illustrated at reference numeral 152, transaction T2 is depicted which includes update U2 to record R2. This transaction results in a journal entry (JE2) which flows to the backup receiver. The backup receiver then sends an acknowledgement to the primary database and deposits journal entry (JE2) within the local journal. Thereafter, the backup applier locks record R2 and applies the journal entry (JE2).

Next, at reference numeral 154, transaction T1 is illustrated which includes update U3 to record R3. This transaction results in a third journal entry (JE3) which is transmitted to the backup receiver. The backup receiver again sends an acknowledgement and deposits this journal entry within the local journal. The backup applier then locks record R3 and applies the journal entry (JE3).

Finally, reference numeral 156 depicts a commit operation for transaction T1. This transaction results in a subsequent journal entry (JE4) which is transmitted to the backup receiver. The backup receiver sends an acknowledgement to the primary database and deposits the journal entry (JE4) within the local journal. The backup applier then releases the locks to records R1 and R3.

Figure 6:
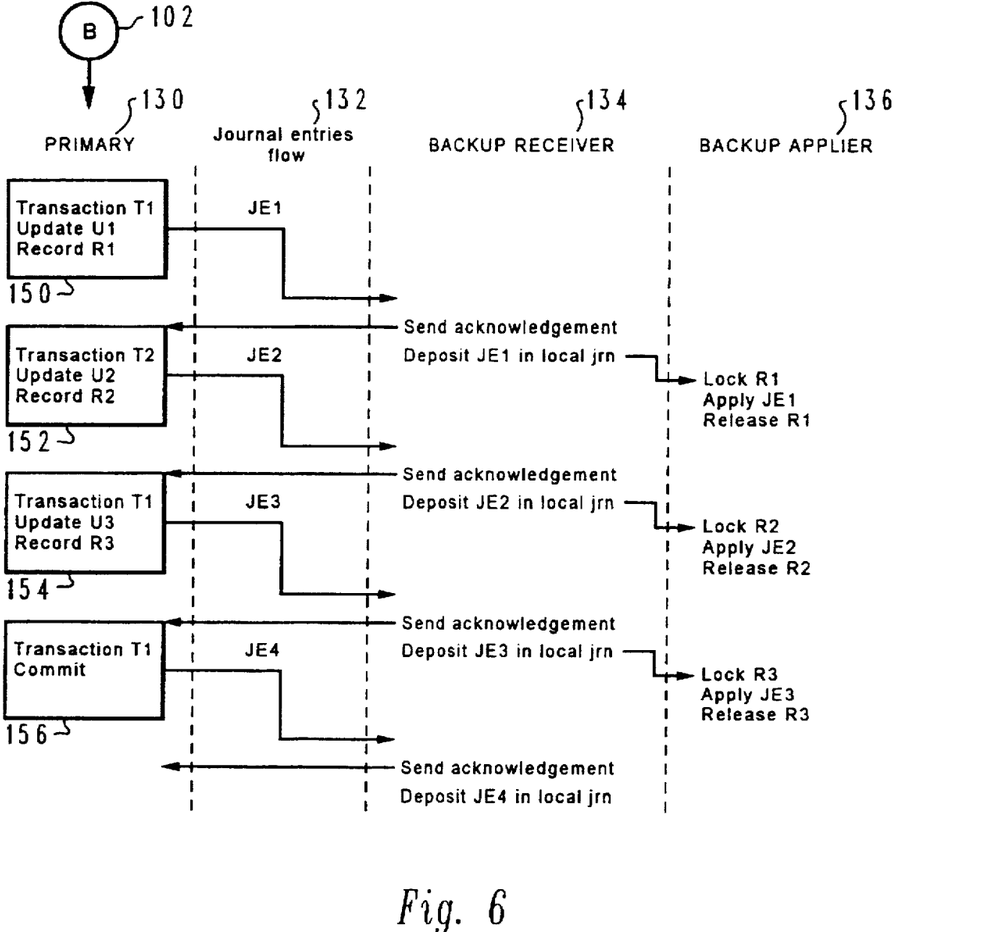

With reference now to FIG. 6, the logic flow which occurs as a result of an update to a record within a replica database set to consistency "Level 0" with serializability not required. For purposes of simplicity of explanation, the columns and transaction events within FIGS. 6–10 are numbered identically to those contained within FIG. 5. As above, the process begins at reference numeral 150 which illustrates a transaction T1 which includes an update U1 to record R1. This transaction results in a journal entry (JE1) which is coupled to the backup receiver. An acknowledgement is sent from the backup receiver to the primary database and journal entry (JE1) is deposited within the local journal. The backup applier then locks record R1 and applies the journal entry (JE1). Thereafter, the backup applier releases record R1, since serializability is not required.

Referring now to reference numeral 152, transaction T2 is illustrated which includes update U2 to record R2. This transaction results in a journal entry (JE2) which is applied to the backup receiver which again sends an acknowledgement to the primary database and deposits journal entry (JE2) within the local journal. The backup applier then locks record R2, applies the journal entry JE2 and thereafter releases record R2.

At reference numeral 154 an additional portion of transaction T1 is illustrated which includes update U3 to record R3. This transaction results in a journal entry (JE3) which is transmitted to the backup receiver. The backup receiver then sends an acknowledgement to the primary database and deposits the journal entry (JE3) in the local journal. The backup applier then locks record R3, applies the journal entry (JE3) and thereafter releases record R3.

Finally, a commit operation for transaction T1 is depicted at reference numeral 156. This commit operation results in a journal entry (JE4) which is transmitted to the backup receiver. An acknowledgement is transmitted to the primary database to the backup receiver and the journal entry (JE4) is deposited within the local journal. As serializability is not required, the commit operation does not result in activity by the backup applier.

Figure 7:
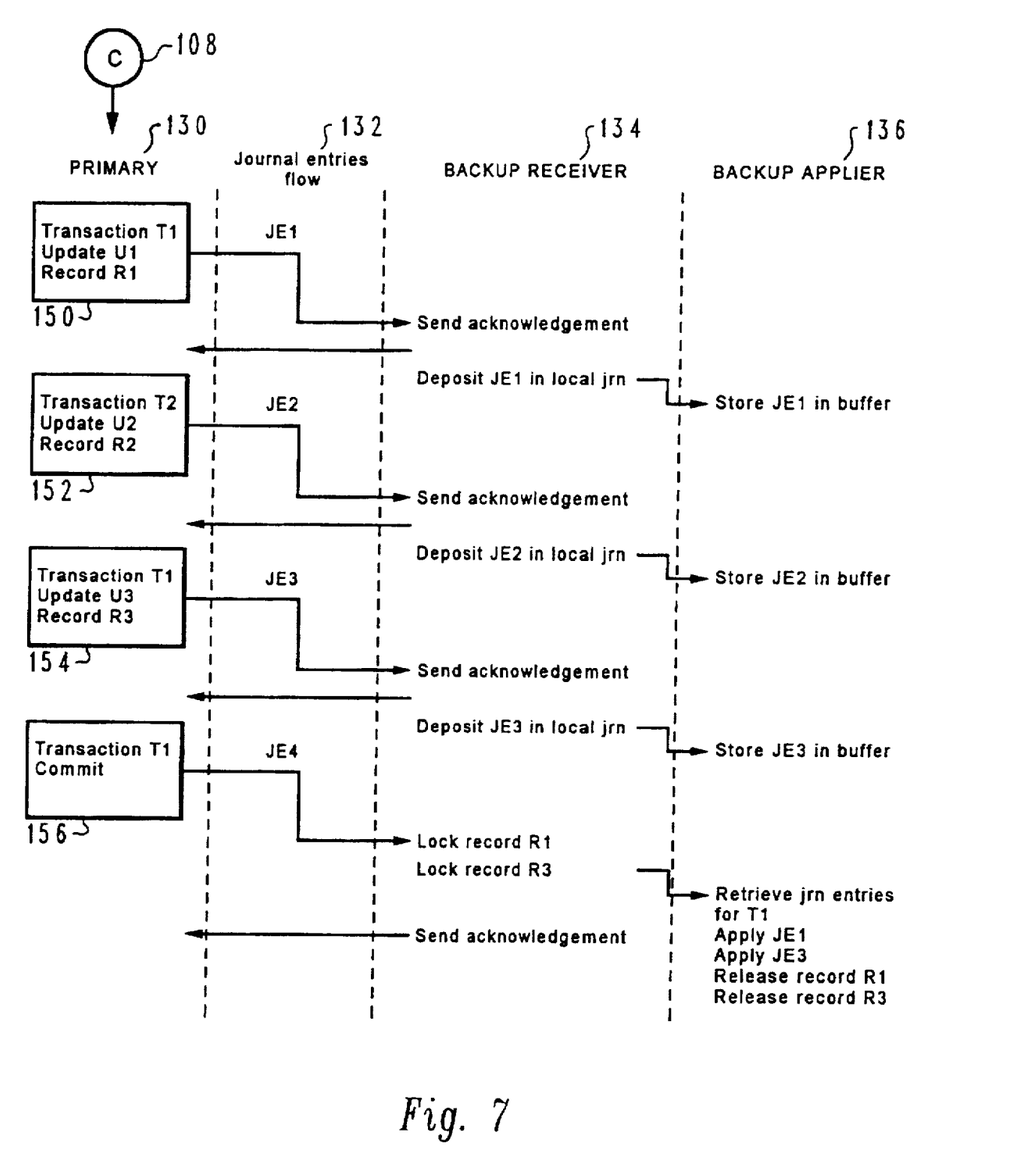

Next, referring to FIG. 7, a logic flow is illustrated which depicts the response to an update to a record within the primary database wherein a consistency level "Level 1" has been selected for a replica database and serializability is required. As above, reference numeral 150 illustrates a transaction T1 which includes update U1 to record R1. This transaction results in a journal entry (JE1) which is transmitted to the backup receiver. An acknowledgement is sent by the backup receiver to the primary database and the journal entry (JE1) is deposited within the local journal. The backup applier then stores this journal entry (JE1) in a buffer. Recalling that consistency level "Level 1" imposes a requirement that queries may only read the latest committed values, those skilled in the art will appreciate that the update to record R1 must necessarily be stored within a buffer until such time as a commit transaction has occurred.

Next, as illustrated at block 152, transaction T2 which includes update U2 to record R2 occurs. This results in a journal entry (JE2) which is coupled to the backup receiver. The backup receiver sends an acknowledgement to the primary database and deposits the journal entry (JE2) within the local journal. As above, the backup applier then stores this journal entry (JE2) within a buffer.

Next, as illustrated at block 154, a transaction T1 which includes update U3 to record R3 occurs. This results in a journal entry JE3 which is coupled to the backup receiver. As above, an acknowledgement is transmitted from the backup receiver to the primary database and the journal entry (JE3) is deposited within a local journal. The backup applier then stores this journal entry (JE3) within a buffer.

Finally, as depicted at block 156, a commit operation for transaction T1 occurs. This results in a journal entry (JE4) which is transmitted to the backup receiver. The backup receiver locks records R1 and R3 and sends an acknowledgement to the primary database. The backup applier then retrieves the journal entries from transaction T1 and applies the appropriate journal entries (JE1 and JE3), those journal entries which are associated with transaction T1. Thereafter, records R1 and R3 are released. Thus, the updates to records R1 and R3 are not applied by the backup applier until such time as a commit operation for that transaction occurs.

Figure 8:
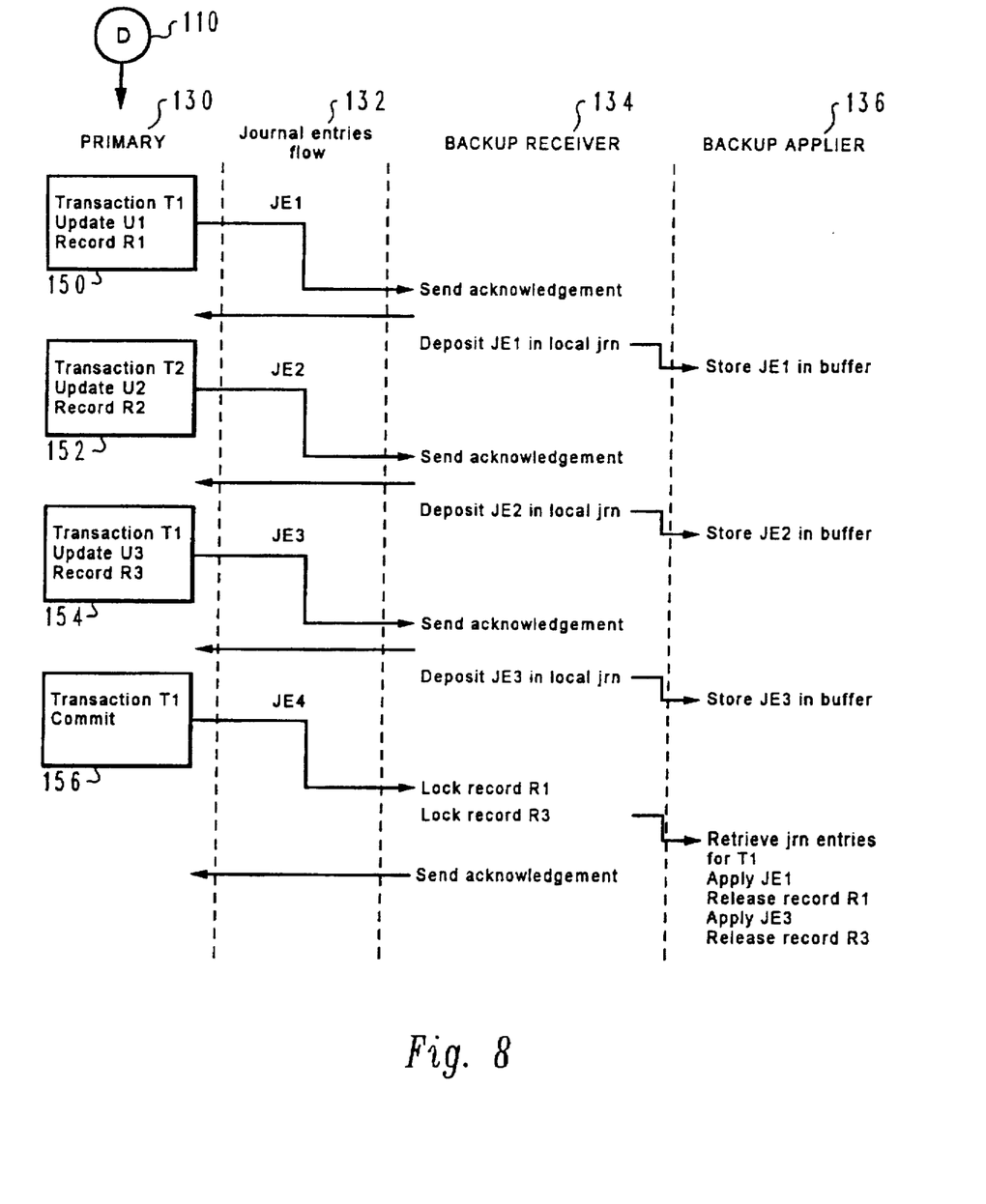

Referring now to FIG. 8 a logic flow is illustrated which describes the response to an updated record within a replica database set to consistency level "Level 1" wherein serializability is not required. As above, reference numeral 150 illustrates a transaction T1 which includes update U1 to record R1. This results in a journal entry (JE1) which is coupled to the backup receiver. The backup receiver sends an acknowledgement to the primary database and deposits this journal entry (JE1) in a local journal. The journal entry (JE1) is then stored within a buffer by the backup applier.

Next, as illustrated at reference numeral 152, transaction T2 occurs which includes an update U2 to record R2. This results in a journal entry (JE2) which is coupled to the backup receiver. The backup receiver then sends an acknowledgement to the primary database and deposits this journal entry (JE2) in a local journal. This journal entry is then stored within a buffer by the backup applier, as above.

At reference numeral 154, the occurrence of transaction T1 is illustrated which includes an update U3 to record R3. This results in a journal entry (JE3) which is coupled to the backup receiver. An acknowledgement is transferred from the backup receiver to the primary database and the journal entry (JE3) is stored within a local journal. As above, journal entry (JE3) is then stored within a buffer by the backup applier.

Finally, a commit operation for transaction T1 occurs, as depicted at block 156. This results in a journal entry (JE4) which is coupled to the backup receiver. The backup receiver then locks records R1 and R3 and sends an acknowledgement to the primary database. Thereafter, the backup applier retrieves the journal entries for transaction T1 and applies the first journal entry (JE1). Record R1 is then released. Next, the second journal entry for transaction T1 (JE3) is applied to record R3 and that record is released. In contrast to the logic flow depicted within FIG. 7, it should be noted that since serializability is not required within this logic flow each record is released after its update has been applied.

Figure 9:
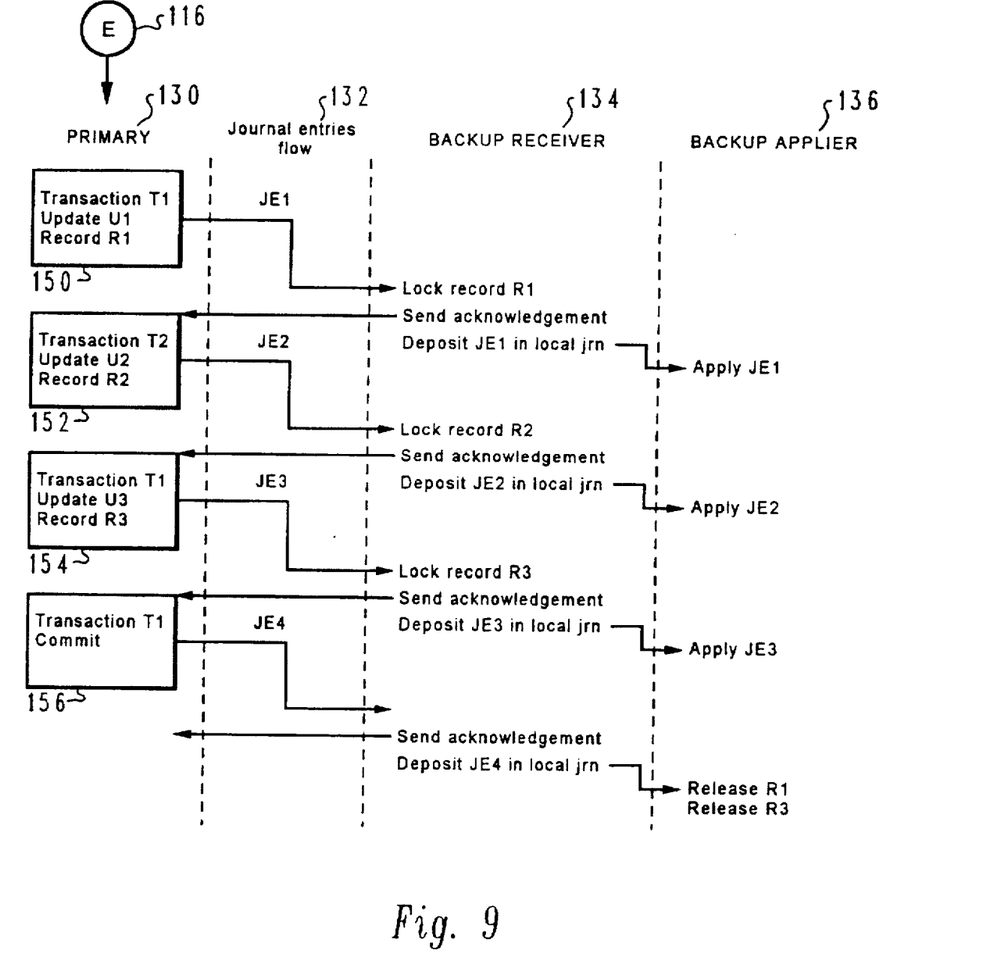

Next, with reference to FIG. 9, there is illustrated a logic flow which depicts the response of a replica database to the updating of a corresponding record within the primary database where consistency level "Level 2" is set with serializability required. As above, reference numeral 150 illustrates the occurrence of a transaction T1 which includes update U1 to record R1. This transaction results in a journal entry (JE1) which is transmitted to the backup receiver. The backup receiver then locks R1 and sends an acknowledgement to the primary database. The journal entry (JE1) is then deposited within a local journal and the backup applier immediately applies the journal entry (JE1). Those skilled in the art will note that a consistency level "Level 2" imposes the requirement that queries read only the latest values, whether or not a commit has occurred. Thus, the update to record R1 will be immediately applied by the backup applier.

Referring now to block 152, a transaction T2 occurs which includes update U2 to record R2 has occurred. This results in a journal entry (JE2) which is coupled to the backup receiver. The backup receiver then locks the record R2, sends an acknowledgement to the primary database and then deposits the journal entry (JE2) in the local journal. The backup applier then immediately applies the journal entry (JE2), updating the record R2 to the latest value.

Referring now to reference numeral 154, a second portion of transaction T1 has occurred which includes an update U3 to record R3. This results in a journal entry (JE3) which is then coupled to the backup receiver. The backup receiver then locks record R3 and sends an acknowledgement to the primary database. The journal entry (JE3) is then deposited within the local journal and the backup applier then applies this journal entry (JE3) to record R3.

Finally, at reference numeral 156, a commit operation for transaction T1 has occurred. This results in a journal entry (JE4) which is coupled to the backup receiver. The backup receiver then sends an acknowledgement to the primary database and deposits this journal entry (JE4) in the local journal. The backup applier then releases records R1 and R3, maintaining the serializability of this portion of the transaction, as required.

Figure 10:
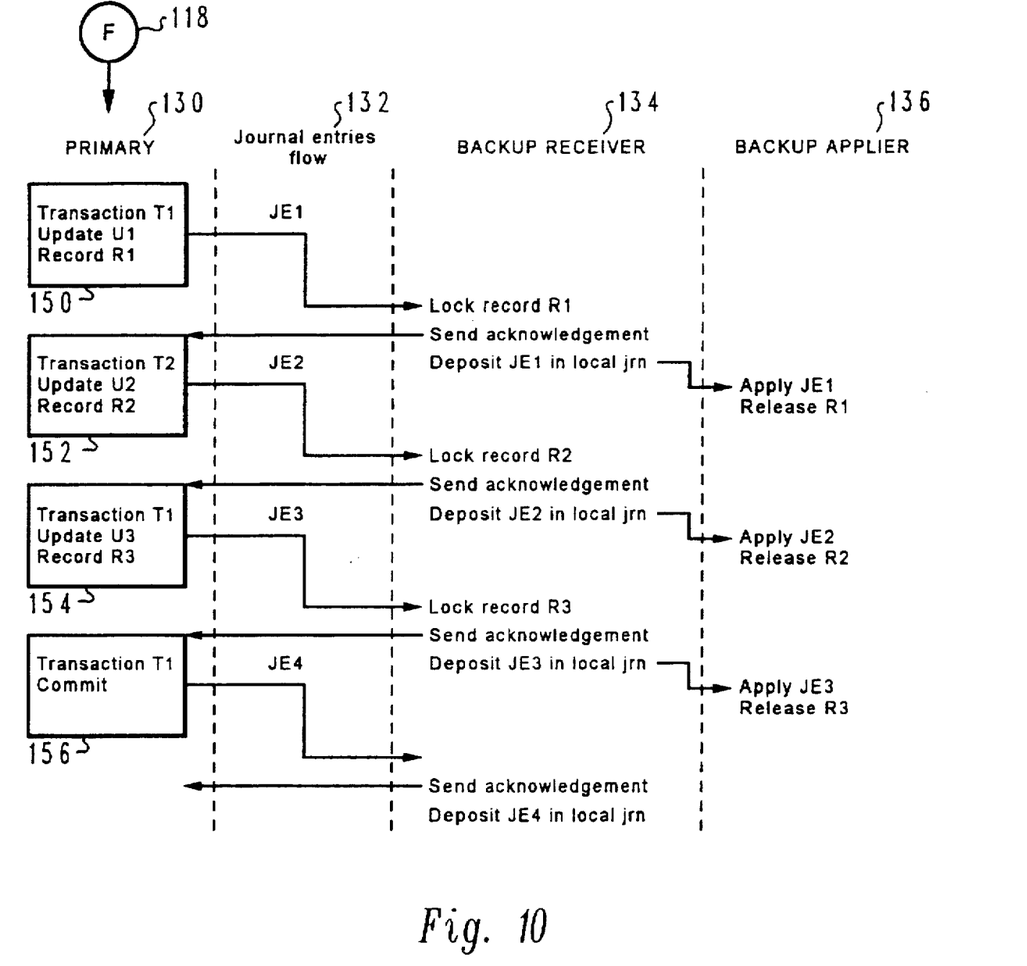

Finally, referring to FIG. 10, there is depicted a logic flow which occurs in response to an update to a record within the primary database in a replica database which has been set to consistency level "Level 2" wherein serializability is not required. As above, at reference numeral 150 the occurrence of a transaction T1 which includes an update U1 to record R1 is illustrated. This results in a journal entry (JE1) which is coupled to the backup receiver. The backup receiver then locks record R1 and sends an acknowledgement to the primary database. The journal entry (JE1) is then deposited within a local journal. The backup applier then applies the journal entry (JE1) and immediately releases record R1, since serializability is not required.

Next, as illustrated at block 152, a transaction T2 has occurred which includes an update U2 to record R2. This results in a journal entry (JE2) which is coupled to the backup receiver. The backup receiver then locks record R2 and sends an acknowledgement to the primary database. The journal entry (JE2) is then deposited within the local journal. The backup applier then applies the journal entry (JE2) and releases record R2.

Next, as depicted at block 154, a subsequent portion of transaction T1 which includes update U3 to record R3 occurs. This occurrence results in a journal entry (JE3) which is coupled to the backup receiver. The backup receiver then locks record R3 and sends an acknowledgement to the primary database. The journal entry (JE3) is then deposited within the local journal and the backup applier then applies the journal entry (JE3) and releases record R3. As should be apparent to those skilled in the art upon reference to this description, since serializability is not required with this level of consistency, the updates to records R1 and R3 are imposed and each record is released immediately after imposition of that update.

Finally, referring to reference numeral 156, a commit operation to transaction T1 has occurred. This results in a journal entry (JE4) which is coupled to the backup receiver. The backup receiver then sends an acknowledgement of this journal entry and deposits the journal entry (JE4) within the local journal.

Upon reference to the foregoing those skilled in the art will appreciate that the method and system of the present invention permits a user or system operator to select an arbitrary consistency level for a replica database within a backup server from a wide spectrum of consistency levels which naturally include a trade-off between consistency and performance. A minimum level of consistency is provided which permits the reading of old and uncommitted values at one replica database while a maximum level is also possible within a second replica of the primary database which will return results as though the query were reading from the primary database. In this manner the efficiency of access to a database within a resilient database system such as the one described herein is greatly enhanced.

While the invention has been particularly shown and described with reference to a preferred embodiment, it will be understood by those skilled in the art that various changes in form and detail may be made therein without departing from the spirit and scope of the invention.

We claim:

1. A method for enhanced efficiency in database access within a distributed data processing system, said method comprising the steps of:

designating a selected database within said distributed data processing system as a primary database, said selected database having a plurality of records stored therein;

replicating said primary database at at least two physical locations within said distributed data processing system;

specifying a plurality of diverse consistency levels which may be maintained between said primary database and each of said replicated databases;

permitting a user to specify a different one of said plurality of diverse consistency levels for query transactions against each of said replicated databases; and thereafter, automatically maintaining said specified one of said plurality of diverse consistency levels between said primary database and each of said replicated databases in response to updates to records within said primary database wherein queries requiring less than a full consistency level may be applied to a replicated database maintained at less than a full consistency level.

2. The method for enhanced efficiency in database access within a distributed data processing system according to claim 1, further including the step of replicating said primary database at a third physical location within said distributed data processing system.

3. A system for enhanced efficiency in database access within a distributed data processing system, said system comprising:

a primary database within said distributed data processing system, said primary database having a plurality of records stored therein;

a replica of said primary database stored at at least two physical locations within said distributed data processing system;

means for specifying a plurality of diverse consistency levels which may be maintained between said primary databases and each of said replicated databases;

means for permitting a user to specify a different one of said plurality of diverse consistency levels for query transactions against each of said replicated databases; and means for automatically maintaining said specified one of said plurality of diverse consistency levels between said primary database and each of said replicated databases in response to updates to records within said primary database wherein queries requiring less than a full consistency may be applied to a replicated database maintained at less than a full consistency.

4. The system for enhanced efficiency in database access within a distributed data processing system according to claim 3, further including a second replica of said primary database stored at a third physical location within said distributed data processing system.

* * * * *